United States Patent
Naganna et al.

(10) Patent No.: US 11,888,907 B2
(45) Date of Patent: Jan. 30, 2024

(54) WORKFLOW-BASED SCREEN SHARING DURING LIVE PRESENTATION

(71) Applicant: International Business Machines Corporation, Armonk, NY (US)

(72) Inventors: Soma Shekar Naganna, Bangalore (IN); Sarbajit K. Rakshit, Kolkata (IN); Subramanian Palaniappan, Trichy (IN); Shivakumar Lakshminarayana, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 17/345,068

(22) Filed: Jun. 11, 2021

(65) Prior Publication Data

US 2022/0400140 A1 Dec. 15, 2022

(51) Int. Cl.
*H04L 65/401* (2022.01)
*G06F 3/14* (2006.01)
*H04L 65/4038* (2022.01)

(52) U.S. Cl.
CPC ........ *H04L 65/4015* (2013.01); *G06F 3/1454* (2013.01); *H04L 65/4038* (2013.01)

(58) Field of Classification Search
CPC ............. H04L 65/4015; H04L 65/4038; H04L 65/1083; H04L 65/40; H04L 65/38; G06F 3/1454
See application file for complete search history.

(56) References Cited

U.S. PATENT DOCUMENTS

| | | | |
|---|---|---|---|
| 9,933,924 B2 | 4/2018 | Taylor | |
| 10,026,108 B2 | 7/2018 | Jackson et al. | |
| 2005/0198139 A1* | 9/2005 | Malkin | G06Q 10/109 709/205 |
| 2008/0022209 A1* | 1/2008 | Lyle | G06Q 10/109 715/730 |
| 2016/0094355 A1* | 3/2016 | Waltermann | H04L 12/1822 715/755 |
| 2016/0149968 A1 | 5/2016 | Yin et al. | |

(Continued)

OTHER PUBLICATIONS

Zhao et al., "Contextual Content Sharing in Collaboration Sessions", IP.com No. IPCOM000251640D, IP.com Electronic Publication Date: Nov. 20, 2017, Copyright: Copyright 2017 Cisco Systems, Inc., 4 pages.

(Continued)

*Primary Examiner* — Lesa M Kennedy
(74) *Attorney, Agent, or Firm* — Matthew Zehrer (57) ABSTRACT

A method, system, and computer program product for workflow-based dynamic screen sharing in a multi-screen presentation environment are provided. The method identifies a presentation schema for a multi-screen presentation. A set of presenters are identified for the multi-screen presentation. The method determines a presentation rate of the multi-screen presentation during the multi-screen presentation. A workflow visualization is generated for the multi-screen presentation based on the presentation schema and the presentation rate. The method dynamically transitions between presenters of the set of presenters during the multi-screen presentation based on the presentation schema, the presentation rate, and the workflow visualization.

20 Claims, 7 Drawing Sheets

(56) References Cited

U.S. PATENT DOCUMENTS

2017/0237788 A1* 8/2017 Xi ...................... H04L 65/4015
              709/204
2020/0186375 A1  6/2020 Faulkner
2022/0103566 A1* 3/2022 Faulkner ............... H04L 67/535

OTHER PUBLICATIONS

"Method and system for load balancing in screenshare based presentation", An IP.com Prior Art Database Technical Disclosure, IP.com No. IPCOM000257192D, IP.com Electronic Publication Date: Jan. 18, 2019, 5 pages.
Mell et al., "The NIST Definition of Cloud Computing", Recommendations of the National Institute of Standards and Technology, Special Publication 800-145, Sep. 2011, 7 pages.

* cited by examiner

WORKFLOW-BASED SCREEN SHARING DURING LIVE PRESENTATION

BACKGROUND

Multimedia presentations are increasingly used in environments where employees, collaborating teams, and scholastic environments include members across differing geographical areas. Users or presenters may share information displayed on their screen during multimedia presentations using screen sharing functionality of applications used for to conduct these multimedia presentations. Remote users or presenters may alternate a display being shared during multimedia presentations. A single designated user or presenter may be responsible for changing between displays being shared. Often at least a portion of display, volume, or other control functionality is passed to the user or presenter associated with the display currently being shared. Current screen sharing functionality for presentations are often limited to a host of the multimedia presentation or a designated presenter. Similar to multimedia presentations, virtual whiteboard presentations often present a single common screen to all participants and enable differing pen or font color t distinguish between users interacting with the shared display.

SUMMARY

According to an embodiment described herein, a computer-implemented method for workflow-based dynamic screen sharing in a multi-screen presentation environment is provided. The method identifies a presentation schema for a multi-screen presentation. A set of presenters are identified for the multi-screen presentation. The method determines a presentation rate of the multi-screen presentation during the multi-screen presentation. A workflow visualization is generated for the multi-screen presentation based on the presentation schema and the presentation rate. The method dynamically transitions between presenters of the set of presenters during the multi-screen presentation based on the presentation schema, the presentation rate, and the workflow visualization.

According to an embodiment described herein, a system for workflow-based dynamic screen sharing in a multi-screen presentation environment is provided. The system includes one or more processors and a computer-readable storage medium, coupled to the one or more processors, storing program instructions that, when executed by the one or more processors, cause the one or more processors to perform operations. The operations identify a presentation schema for a multi-screen presentation. A set of presenters are identified for the multi-screen presentation. The operations determine a presentation rate of the multi-screen presentation during the multi-screen presentation. A workflow visualization is generated for the multi-screen presentation based on the presentation schema and the presentation rate. The operations dynamically transition between presenters of the set of presenters during the multi-screen presentation based on the presentation schema, the presentation rate, and the workflow visualization.

According to an embodiment described herein, a computer program product for workflow-based dynamic screen sharing in a multi-screen presentation environment is provided. The computer program product includes a computer-readable storage medium having program instructions embodied therewith, the program instructions being executable by one or more processors to cause the one or more processors to identify a presentation schema for a multi-screen presentation. A set of presenters are identified for the multi-screen presentation. The computer program product determines a presentation rate of the multi-screen presentation during the multi-screen presentation. A workflow visualization is generated for the multi-screen presentation based on the presentation schema and the presentation rate. The computer program product dynamically transitions between presenters of the set of presenters during the multi-screen presentation based on the presentation schema, the presentation rate, and the workflow visualization.

DETAILED DESCRIPTION

The present disclosure relates generally to methods for dynamic screen sharing. More particularly, but not exclusively, embodiments of the present disclosure relate to a computer-implemented method for workflow-based dynamic screen sharing in a multi-screen presentation environment. The present disclosure relates further to a related system for dynamic screen sharing, and a computer program product for operating such a system.

Multimedia presentations are used in varying circumstances where presenters, participants, users, or viewers of the presentation may not be present in a single location, and where multiple presenters take part in the multimedia presentation. Display screen sharing during multimedia presentations enable remote users to share a display screen for presenters who are remote from one another. Current screen sharing functionality enable display screen sharing between presenters orchestrated by a central host or current presenter. Current display screen sharing functionality lacks coordinated, automated, or dynamic flow for screen sharing among presenters, opting instead for manual transitions between presenters. Similarly, current screen sharing functionality often lacks a coordinated flow for sharing multiple screens based on a workflow, content, or timing of the multimedia presentation.

During screen sharing presentations using current screen sharing functionality, a set of presenters may share their screen in a workflow. The workflow may be manually controlled based on an event or time schedule. The workflow may be frustrated or complicated based on local regulatory guidelines, rules, or laws preventing storage of certain data in a single or centralized location. For example, certain data from a first region may not be stored in a second region, but may be temporarily displayed during a presentation for suitable participants or viewers. Manual transitions between displays to be shared often interrupt a flow of a presentation. These manual transitions may introduce technical issues such as muted presenters, incorrectly shared screens, unintentional disclosure of information, and loss of connectivity, as well as aesthetic issues.

Embodiments of the present disclosure enable automated and dynamic sharing of display screens in multimedia and multi-presenter presentations. The present disclosure enables analysis of presentation content, presentation rate, and workflow. Analysis of the presentation content, presentation rate, or workflow may enable dynamic and automated screen sharing between two presenters, a series of presenters, or multiple simultaneous presenters. Embodiments of the present disclosure enable generation and display of a presentation workflow in a multi-user or multi-presenter environment. The presentation workflow enables presentation and visualization of a number of screens to be shared at a time during a presentation. Some embodiments of the present disclosure enable graphical visualization of a workflow of shared screens in a multimedia presentation to aid in participant understanding of the how the workflow is happening or progressing. Some embodiments of the present disclosure identify a speed or rate of a multimedia presentation or workflow. In such instances, the present disclosure may dynamically control transfers from one display screen to another. Dynamic control of display screen switching or transition may be performed in response to the rate of workflow, content of the presentation, audience reaction to the workflow or presentation, or other relevant aspects of the presentation.

Embodiments of the present disclosure enable dynamic screen sharing, presentation sharing, image sharing, or experience sharing across differing types of multi-user applications. In some instances, the present disclosure enables dynamic screen sharing for multi-party presentation software. Some embodiments of the present disclosure enable dynamic screen sharing, image sharing, video feed sharing, or experience sharing in virtual reality environments or presentations. Embodiments of the present disclosure enable collaborative learning among remote participants while streamlining transitions between learners or presenters. Some embodiments of the present disclosure enable dynamic or automated presentation of multi-screen presentations directly from a server or a set of distributed servers or computing devices.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
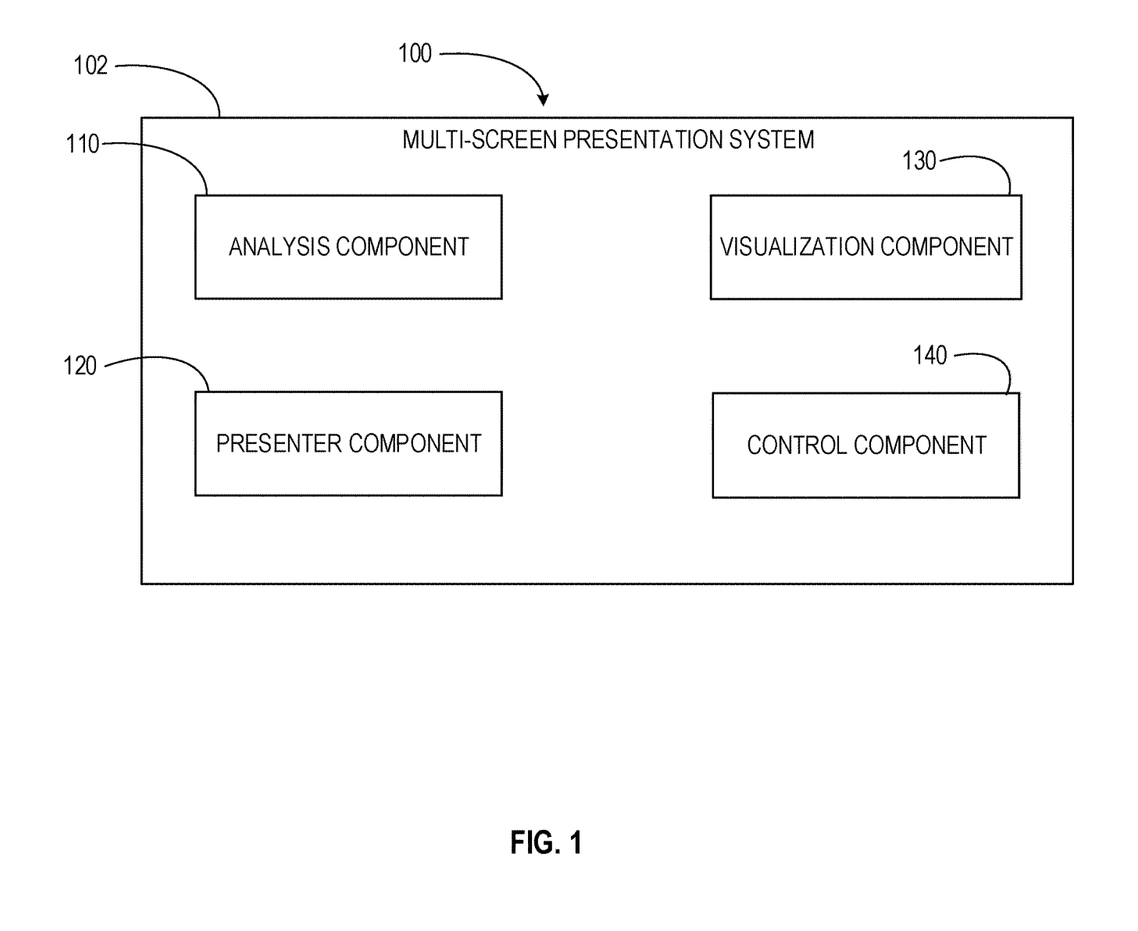
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a multi-screen presentation system 102. The multi-screen presentation system 102 may comprise an analysis component 110, a presenter component 120, a visualization component 130, and a control component 140. The analysis component 110 identifies presentation schema, presentation rules, and presentation content for multi-screen presentations. The presenter component 120 identifies sets of presenters associated with multi-screen presentations and subsets or individual presenters associated with designated portions of multi-screen presentations. The visualization component 130 generates visualizations of presentation schema and shared presenter displays. The control component 140 dynamically controls changes in screen or display and audio control within multi-screen presentations. Although described with distinct components, it should be understood that, in at least some embodiments, components may be combined or divided, and/or additional components may be added without departing from the scope of the present disclosure.

Figure 2:
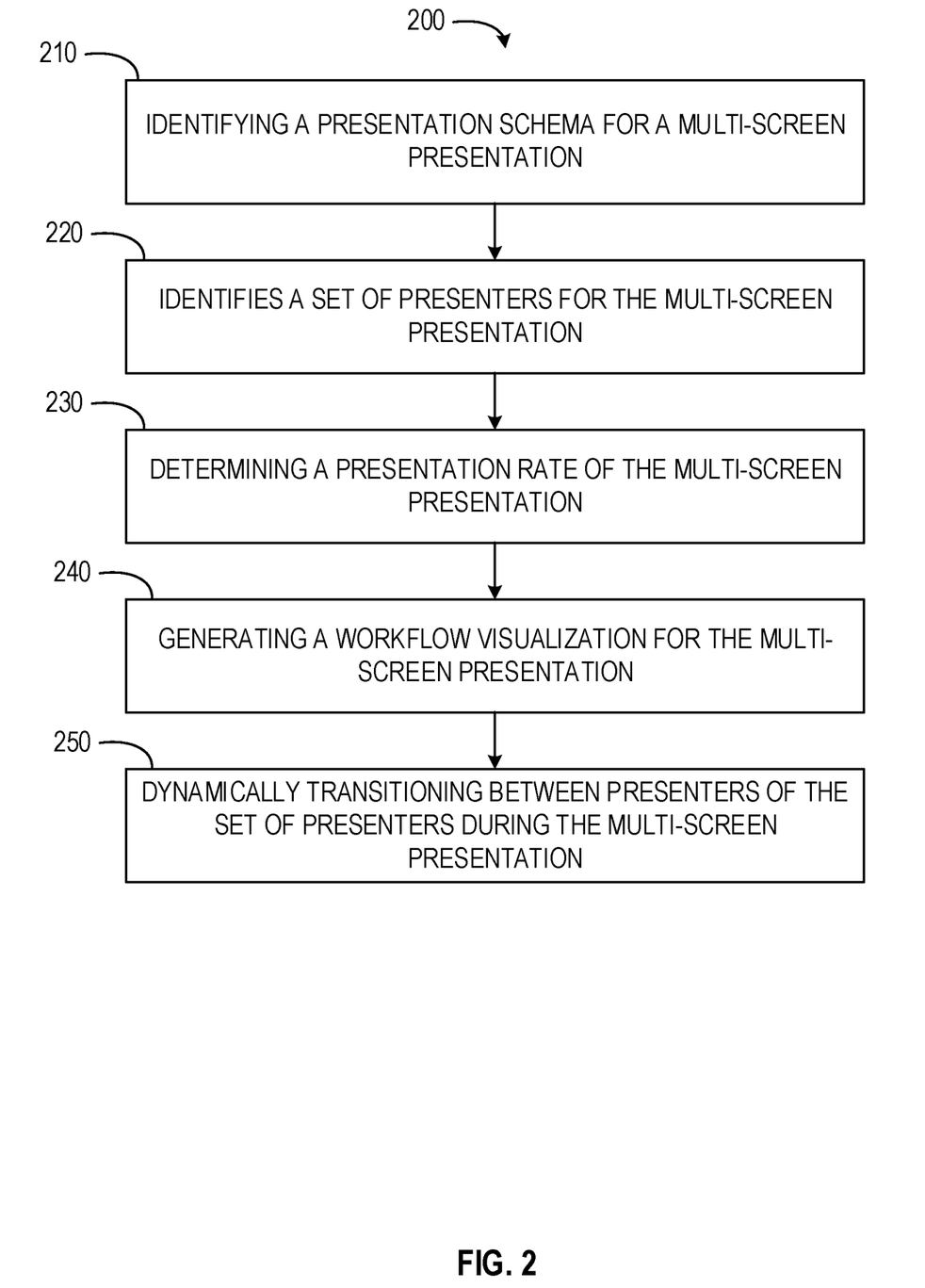
FIG. 2 depicts a flow diagram of a computer-implemented method for dynamic screen sharing in a multi-screen presentation environment, according to at least one embodiment.

Referring now to FIG. 2, a flow diagram of a computer-implemented method 200 is shown. The computer-implemented method 200 is a method for dynamic screen sharing in a multi-screen presentation environment. In some embodiments, the computer-implemented method 200 may be performed by one or more components of the computing environment 100, as described in more detail below.

At operation 210, the analysis component 110 identifies a presentation schema for a multi-screen presentation. The analysis component 110 may identify the presentation schema of the multi-screen presentation on one or more computing devices across which the multi-screen presentation is distributed. Each computing device of the one or more computing devices may include a display screen or display device from which at least a portion of the multi-screen presentation is to be shared. The analysis component 110 may act as a presentation server communicating or coordinating with the one or more computing devices to present or facilitate presentation of the multi-screen presentation. The analysis component 110 may determine the presentation schema indicating when screen sharing is to be changed between computing devices of presenters, a sequence of screen share workflow, and a duration of shared screens in any workflow.

In some embodiments, the presentation schema is a presentation rule for the multi-screen presentation. The presentation rule may be or include a defined workflow or defined workflow rule. The presentation rule may be a predefined time schedule for presentation of the multi-screen presentation, a predefined time schedule of display of a portion (e.g., a slide) of the multi-screen presentation, a predefined start time, a predefined end time, combinations thereof, or any other suitable rule. In some instances, the presentation rule is a presentation content workflow. The presentation content workflow may designate a display screen, a time, or other rule for transitioning between display devices or screens being shared. The presentation content workflow may define conditions under or at which the multi-screen presentation is to switch one or more of presentation control, screen or display being shared, and audio control from one computing device of a presenter to another computing device of a subsequent presenter. The presentation content workflow may be, at least partially, defined by a pace or timing of a presentation being given. In some instances the presentation rule, content workflow, defined workflow rule, or defined workflow may comprise information contained within the multi-screen presentation, metadata associated with the multi-screen presentation, or other suitable data capable of or configured to indicate one or more of a computing device and a presenter associated with at least a portion of the multi-screen presentation. In embodiments where the presentation rule or workflow rule is part of the multi-screen presentation metadata, the presentation rule or workflow rule may be executed along with the presentation flow.

In some embodiments, the presentation schema is a presentation content of the multi-screen presentation. Presentation content may include information contained within the multi-screen presentation. The presentation content may also include logic for sharing one screen to one or more screen. The logic may be time based or event based. Event based screen sharing may assist in triggering screen sharing when a specified action is performed or identified or a specified content is presented. In some instances, the presentation content includes information contained in a slide deck, an agenda of a presentation, metadata within the multi-screen presentation, or any other suitable content of the multi-screen presentation. The analysis component 110 may analyze the presentation content by performing text recognition, optical character recognition, image recognition, or any other suitable content analysis mechanism.

The analysis component 110 may also analyze input devices for the multi-screen presentation. In some instances, the input devices include one or more computing devices. The input devices may also include image capture or video capture devices, such as a camera. In such instances, the analysis component 110 may identify a field of view of the camera used as an input device for a portion of the multi-screen presentation or workflow.

At operation 220, the presenter component 120 identifies a set of presenters for the multi-screen presentation. In some embodiments, the presenter component 120 cooperates with the analysis component 110 to identify the set of presenters by using information analyzed by the analysis component 110. The presenter component 120 may identify the set of presenters based on the presentation schema, the defined workflow, the presentation content workflow, the presentation content, metadata associated with the multi-screen presentation, combinations thereof, or any other suitable data. For example, the presenter component 120 may identify the set of presenters based on names, titles, or contact information present within or in metadata associated with the multi-screen presentation. The presenter component 120 may identify the set of presenters based on Internet Protocol (IP) address, media access control (MAC) address, or any other suitably identifying information for computing devices associated with the multi-screen presentation or presenters for the multi-screen presentation. The identifying information used by the presenter component 120 may be identifying information by which presenters have chosen or opted into using for identification by components of the multi-screen presentation system 102. In some embodiments, the presenter component 120 identifies the set of presenters based on the set of presenters being designated as presenters for or accessing and self-identifying as presenters for the multi-screen presentation. In such instances, the presenters may access the multi-screen presentation system 102 or have identifying information provided to the multi-screen presentation system 102 to establish a relationship between the presenters and the multi-screen presentation.

Once the set of presenters have been identified, the presenter component 120 and the analysis component 110 may associate each presenter with at least a portion of the multi-screen presentation within the multi-screen presentation system 102. For example, where the multi-screen presentation is a slide deck composed of a set of slides, the presenter component 120 may associate each presenter with one or more subsets of slides. Each presenter may be associated with a distinct subset of slides. In some instances, multiple presenters are associated with a shared subset of slides. Where a workflow, such as a defined workflow or a presentation content workflow, is present for the multi-screen presentation, the presenter component 120 may associate one or more presenters with portions of the workflow.

At operation 230, the analysis component 110 determines a presentation rate of the multi-screen presentation. In some embodiments, the presentation rate is determined during the multi-screen presentation. The presentation rate may be determined as a portion of the multi-screen presentation presented for a given interval of time. The analysis component 110 may determine the portion of the multi-screen presentation being currently presented by determining a portion of the presentation content being presented on a display screen. The presentation content being displayed may be determined based on image analysis, optical character recognition, text analysis, metadata, or any other suitable method. The analysis component 110 may determine the portion of the multi-screen presentation being presented by determining a content of an audio stream being presented along with information on a display screen. In some embodiments, the analysis component 110 determines the portion of the multi-screen presentation being currently presented based on metadata included within or associated with the multi-screen presentation. The analysis component 110 may also determine the portion being presented based on previously generated metadata. In such embodiments, the analysis component 110 may generate metadata indicating portions of the multi-screen presentation in operation 210. The metadata may be generated based on content included in differing portions of the multi-screen presentation. The metadata may then be added to the multi-screen presentation for use in operation 230.

The analysis component 110 may determine the presentation rate by identifying presentation content currently being presented during the multi-screen presentation in relation to one or more of an elapsed time from a beginning of the multi-screen presentation and a time of day. For example, the presentation rate may be determined as a number of slides per minute or a number of minutes per slide for a slide deck being presented. By way of further example, the presentation rate may be determined based on a starting time of the multi-screen presentation and a current slide of the slide deck being presented on a display screen.

In some embodiments, the analysis component 110 determines the presentation rate based on an audience reaction to the multi-screen presentation as the presentation is being presented. The analysis component 110 may identify an audience reaction based on interactions of the audience with the multi-screen presentation. For example, audience responses to polling questions in a multi-screen presentation may indicate a level of audience participation, attendance, or attention paid to the multi-screen presentation. The analysis component 110 may identify an audience reaction based on comments, chat, or notes generated by one or more audience members and shared with, posted to, or submitted to one or more presenters or a user interface associated with the multi-screen presentation. For example, the analysis component 110 may identify comments by audience members, within a chat stream of the multi-screen presentation, requesting the presentation to be slowed or a slide to be repeated.

At operation 240, the visualization component 130 generates a workflow visualization for the multi-screen presentation. In some embodiments, the workflow visualization is generated based on the presentation schema. The workflow visualization may also be generated based on the presentation rate of the multi-screen presentation. In some instances, the workflow visualization is generated based on the presentation schema and the presentation rate of the multi-screen presentation. One or more presenters may use the workflow visualization to define an agenda topic for the multi-screen presentation. In some instances, one or more presenters define how a screen is to be shared in a workflow. The one or more presenters may select a manner of screen sharing or presentation based on options provided within the workflow visualization.

In some embodiments, the visualization component 130 generates the workflow visualization based on a number of display screens to be shared at a time during the presentation. The workflow visualization may include a representation of the number of screens, a representation of each screen and a content displayed thereon, and control elements configured to adjust or change the workflow visualization or elements thereof. The control elements may include user interface elements distributed within the workflow visualization. Selection of the user interface elements may cause changes to the number of screens to be presented, the number of screens to be presented at a given time, the order or sequence of presentation of portions of the multi-screen presentations, voice control transfer, rate of presentation, combinations thereof, or any other suitable aspect of the multi-screen presentation. In some embodiments, selection of a user interface element of the control elements may cause a reversion of screen control, voice control, or a combination of screen and voice control. Reversion of screen control may also revert sharing of a screen of the presenter receiving the reversion of screen or voice control.

Figure 3:
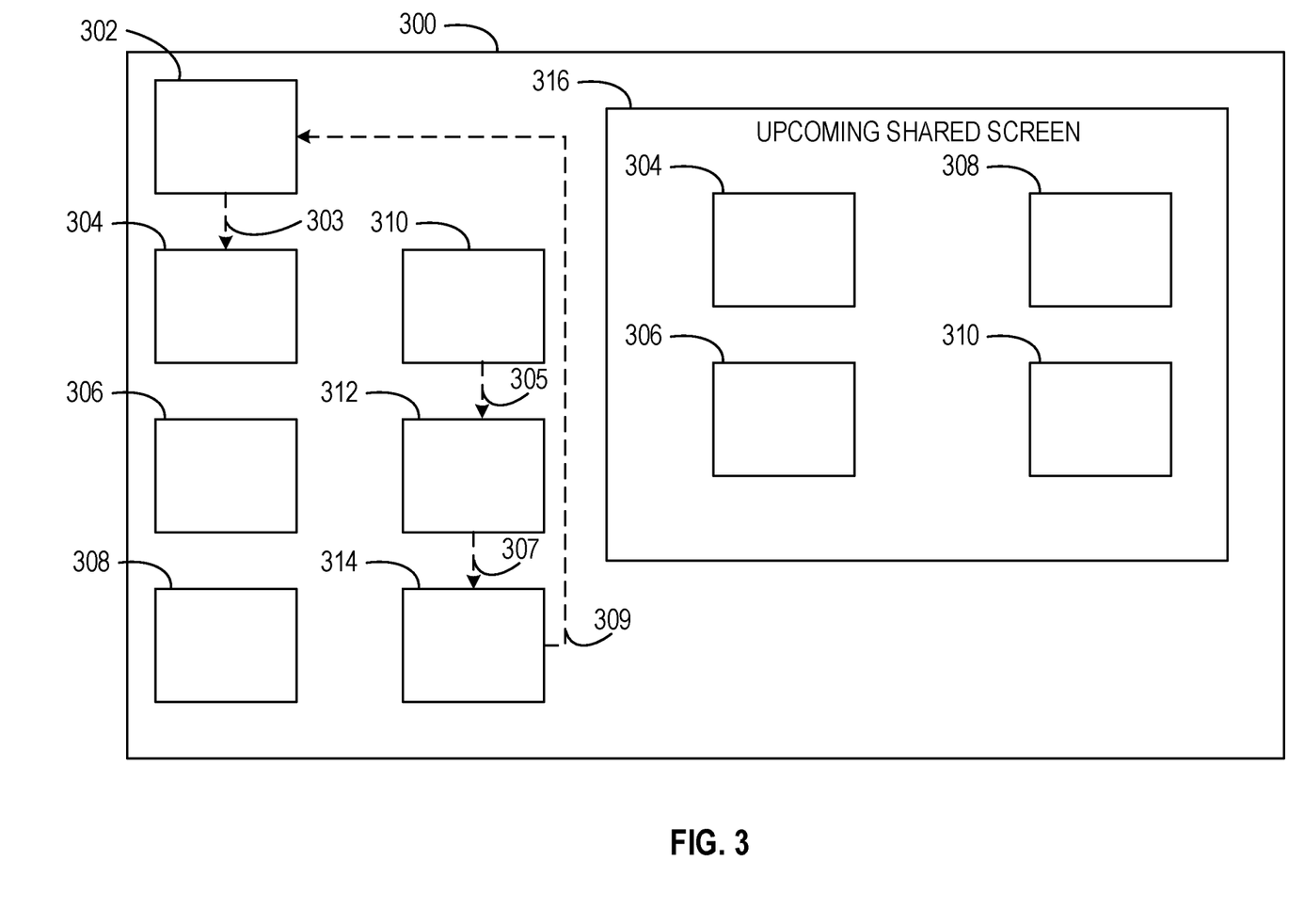
FIG. 3 depicts a user interface of a visualization for a multi-screen presentation workflow, according to at least one embodiment.

As shown in FIG. 3, a workflow visualization 300 includes a representation of displays to be shared during a multi-screen presentation. The workflow visualization 300 includes representations of display devices 302, 304, 306, 308, 310, 312, and 314. The representations of the display devices may include visualizations of presentation or other content being displayed or transmitted by computing devices of respective presenters of the set of presenters of the multi-screen presentation. The workflow visualization may depict representations of transitions 303, 305, 307, and 309. The transitions may indicate transitions between display devices of presenters, where the display devices are to be sequentially displayed at different times during the multi-screen presentation. The workflow visualization 300 includes a shared screen depiction 316. In some embodiments, the shared screen depiction 316 presents a screen or screens currently being shared in the multi-screen presentation. In some instances, the shared screen depiction 316 presents a screen or screens which are upcoming shared screens or next screen(s) to be shared in the workflow. In some instances, the workflow visualization depicts a plurality of shared screen depictions. Where a plurality of shared screen depictions are presented, a first shared screen depiction may display a currently shared screen or display and a second shared screen depiction may display an upcoming shared screen or screens to be displayed in a subsequent portion of the multi-screen presentation. In some instances, one or more presenters may interact with user interface elements or representations of the display screens to modify a position of the screens which are currently being displayed or screens which are to be displayed at a later time in the multi-screen presentation.

At operation 250, the control component 140 dynamically transitions between presenters of the set of presenters during the multi-screen presentation. The control component 140 may initially identify active presenters and display devices of the active presenters. The control component 140 may cooperate with the analysis component 110 to determine what activity or content is in progress during presentation of the multi-screen presentation, and identify a next portion of the multi-screen presentation or next presenter in sequence to perform dynamic transitions between presenters. In some embodiments, the dynamic transitioning is performed based on one or more of the presentation schema, the presentation rate, and the workflow visualization. In some embodiments, the workflow visualization is presented to the set of presenters while the multi-screen presentation is in progress. The workflow visualization may be presented to the set of presenters on a display device of each presenter along with the multi-screen presentation or a representation thereof and any other suitable user interface or display elements.

The dynamic transitioning may be performed based on or in response to a detected event. The detected event may be a contextual event for the multi-screen presentation, an Internet of Things (IoT) event, a wearable device event identified from a wearable device feed, a facility event identified from a facility device feed, or any other suitably detectable event which may occur during presentation of the multi-screen presentation. In some instances, detected events may be events associated with audience members, participants, or presenters of the multi-screen presentation.

In instances where a portion of the multi-screen presentation or workflow is captured via a camera, the control component 140 may cooperate with one or more components of the multi-screen presentation system 102 to determine a portion of the workflow or multi-screen presentation is captured by the camera. The control component 140 may cooperate with components of the multi-screen presentation system 102 to identify a field of view for the camera, where the field of view is to be displayed during the multi-screen presentation. The control component 140 may then transition from a display screen of a presenter to the field of view of the camera, during the multi-screen presentation. Once transitioned to the field of view of the camera, the control component 140 may cause the presentation content displayed within the field of view of the camera to be presented as part of the multi-screen presentation viewable by one or more of the presenters, participants, and the audience. In some instances, the portion of the workflow within the field of view may be a live presentation. In such instances, the field of view of the camera may be shared as part of the multi-screen presentation to incorporate the live presentation as a portion of the multi-screen presentation.

In dynamically transitioning between presenters, the control component 140 may transfer a display of the multi-screen presentation from a first presenter display to a second presenter display. In some instances, the control component 140 transfers voice control and screen share control from a first presenter to a second presenter while dynamically transitioning between presenters. The first presenter may be a primary presenter. In some instances, the primary presenter retains voice control for the multi-screen presentation during the presentation. In such instances, the control component 140 may not transfer audio or voice control to a subsequent presenter when the subsequent presenter's screen is shared. For example, a screen of a second presenter may be shared during a multi-screen presentation but a voice or audio stream occurring while the screen of the second presenter is shared may be a video or audio stream from another presenter, participant, audience member, or auto-voice generation engine. In some instances, the control component 140 may transfer or distribute voice control between presenters of the set of presenters. Where the voice control is distributed, the receiving presenter may be notified when the screen and voice control is shared. The receiving presenter may be notified in the workflow visualization prior to the transfer.

In some embodiments, the control component 140 cooperates with the analysis component 110 to analyze activity logs for computing devices associated with the presenters and the multi-screen presentation. For example, the control component 140 and the analysis component 110 may analyze activity logs from computing devices of each presenter, a presentation server, distributed presentation servers, an IoT feed, or any other suitable computing device. The control component 140 may use activity logs from a computing device executing at least a portion of activity represented by the activity logs. Based on the activity logs, in some embodiments, the control component 140 identifies next content to be shared as part of the multi-screen presentation and the next presenter associated with the next content to be shared per a workflow sequence of the presentation. The workflow sequence may be determined based on the presentation schema.

In some embodiments, the control component 140 dynamically transitions between presenters based on audience reactions. In such embodiments, the control component 140 may modulate a presentation rate based on audience reactions. The audience reactions may indicate a desire to slow the rate of presentation, speed up the rate of presentation, or review a recently presented content or aspect of the multi-screen presentation. In some embodiments, the control component 140 cooperates with the analysis component 110 and visualization component 130 to identify a modified presentation rate, based on audience reactions or feedback. The modified presentation rate may be an increased presentation rate or a decreased presentation rate. In some instances, the modified presentation rate is a presentation pause. The presentation pause may pause the presentation at a current point in the multi-screen presentation. The presentation pause may also pause the presentation at a previous point in the multi-screen presentation.

Once the modified presentation rate is determined, the control component 140 and the visualization component 130 may generate a rate visualization or rate notification. The rate visualization or rate notification may be presented within the workflow visualization. In some embodiments, the rate notification is a user interface element configured to notify presenters of an impending modified presentation rate or presentation pause. The rate visualization may include a set of user interface elements configured to provide the set of presenters with information relating to, describing, or defining the modified presentation rate or presentation pause. In some instances, the rate visualization provides an audience reaction or set of audience reactions triggering the modified presentation rate or presentation pause. The rate visualization may also provide the modified presentation rate, an estimated time impact of the presentation pause or the modified presentation rate, and an estimated duration of the modified presentation rate. The estimated time impact may indicate a modified time at which a subsequent presenter is expected to begin an associated portion of the multi-screen presentation.

Figure 4:
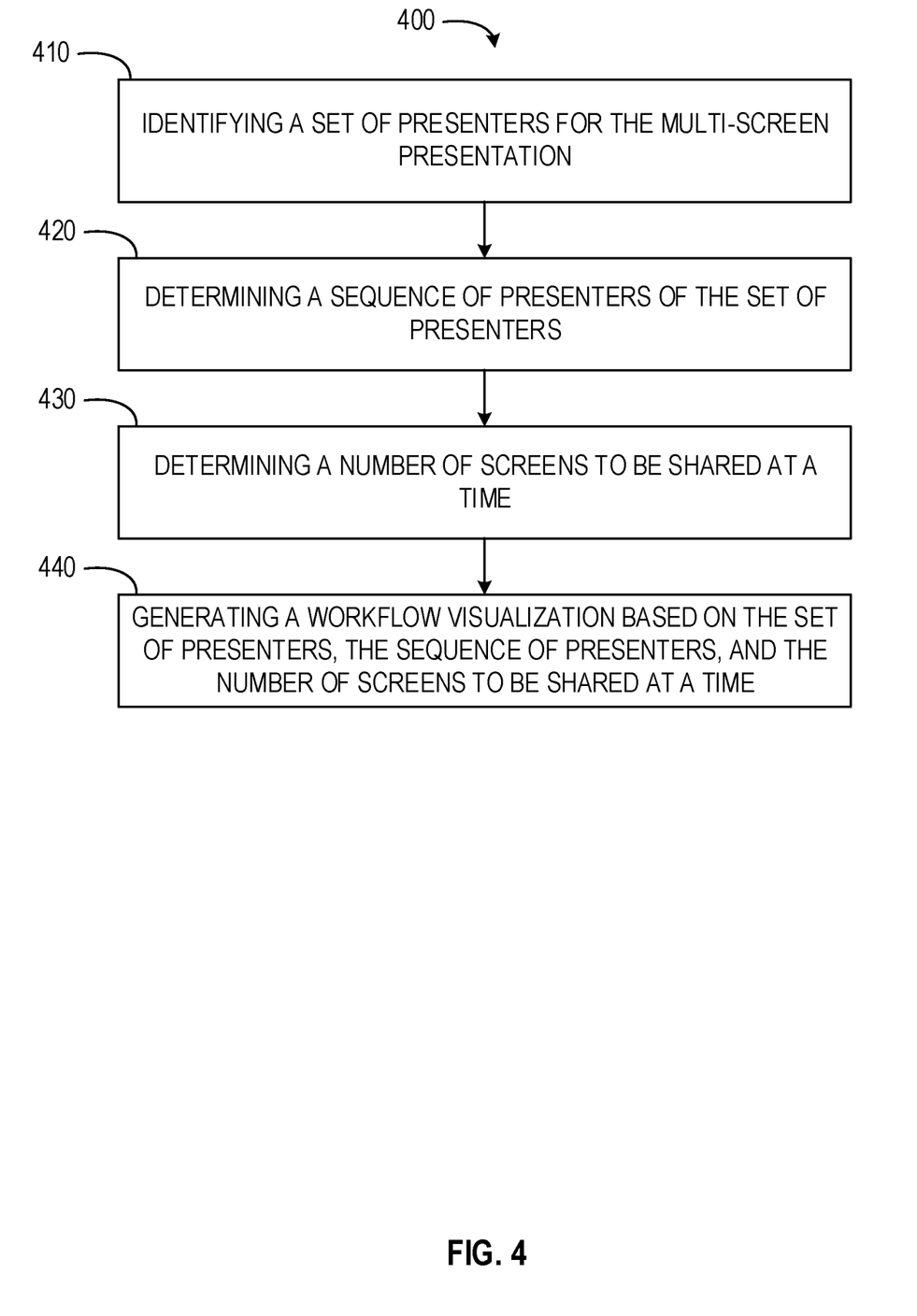
FIG. 4 depicts a flow diagram of a computer-implemented method for dynamic screen sharing in a multi-screen presentation environment, according to at least one embodiment.

FIG. 4 shows a flow diagram of an embodiment of a computer-implemented method 400 for dynamic screen sharing in a multi-screen presentation environment. The method 400 may be performed by or within the computing environment 100. In some embodiments, the method 400 comprises or incorporates one or more operations of the method 200. In some instances, operations of the method 400 may be incorporated as part of or sub-operations of the method 200.

In operation 410, the presenter component 120 identifies a set of presenters for the multi-screen presentation. The set of presenters may be identified at a time prior to initiating the multi-screen presentation. The set of presenters may also be identified upon establishing a meeting, session, call, or other communication structure through which the multi-screen presentation is to be presented. In some instances, the set of presenters are identified as active presenters and inactive presenters. In such instances, an active presenter may be identified as being a presenter for a specified multi-screen presentation and logged into an established communication structure. An inactive presenter may be identified as being a presenter for a specified multi-screen presentation but not logged into the established communication structure. The presenter component 120 may identify the set of presenters in a manner similar to or the same as described above with respect to operation 220.

In operation 420, the presenter component 120 determines a sequence of presenters of the set of presenters. In some embodiments, the sequence of presenters is determined based on the presentation schema. The sequence of presenters may be determined based on the set of presenters for the multi-screen presentation. In such instances, the presenter component 120 may determine a portion of the multi-screen presentation associated with each presenter, an order of presentation of a set of portions of the multi-screen presentation, and the sequence of presenters based on the order of presentation of the set of portions. The sequence of presenters may be initially determined for active presenters, and modified based on inactive presenters becoming active presenters by logging into the communication structure. In some embodiments, the sequence of presenters is determined based on the presentation schema and the set of presenters for the multi-screen presentation.

In operation 430, the presenter component 120 determines a number of screens to be shared at a time. In some embodiments, the number of screens to be shared are determined for a time during one or more portions of the multi-screen presentation. The time for sharing a plurality of screens may be any time or times during the multi-screen presentation.

As shown in FIG. 3, for example, the presenter component 120 may determine four display screens are to be presented simultaneously at a given point in the multi-screen presentation based on the presentation schema. As shown in FIG. 3, the presentation schema may indicate transitions between display devices 302, 304, 306, 308, 310, 312, and 314. The presenter component 120 may determine that the four display screens to be displayed simultaneously are display devices 304, 306, 308, and 310.

In operation 440, the visualization component 130 generates the workflow visualization based on the set of presenters, the sequence of presenters, and the number of screens to be shared at a time. In some embodiments, the visualization component 130 updates, modifies, or re-generates the workflow visualization as the multi-screen presentation is being presented. In such embodiments, the visualization component 130 may dynamically present the workflow visualization to the set of presenters so that the set of presenters may graphically visualize the workflow of shared screens and the timing of the shared screens during live presentation.

As shown in FIG. 3, for example, the visualization component 130 may generate the workflow visualization to show a representation of display device 302. The workflow visualization may depict a transition 303 between display device 302 and the set of display devices 304, 306, 308, and 310. The workflow visualization may then depict a transition 305 between the set of display devices 304, 306, 308, and 310 to display device 312. Finally, the workflow visualization may depict a transition 307 between display device 312 to display device 314, and a transition 309 back to display device 302 from display device 314. By way of further example, during presentation of the multi-screen presentation, the function of the multi-screen presentation and the workflow visualization may be presented or shown in different screens or display devices. In such examples, based on the presentation of the multi-screen presentation and the flow of functionality or workflow visualization, the shared screen may be changed dynamically.

Figure 5:
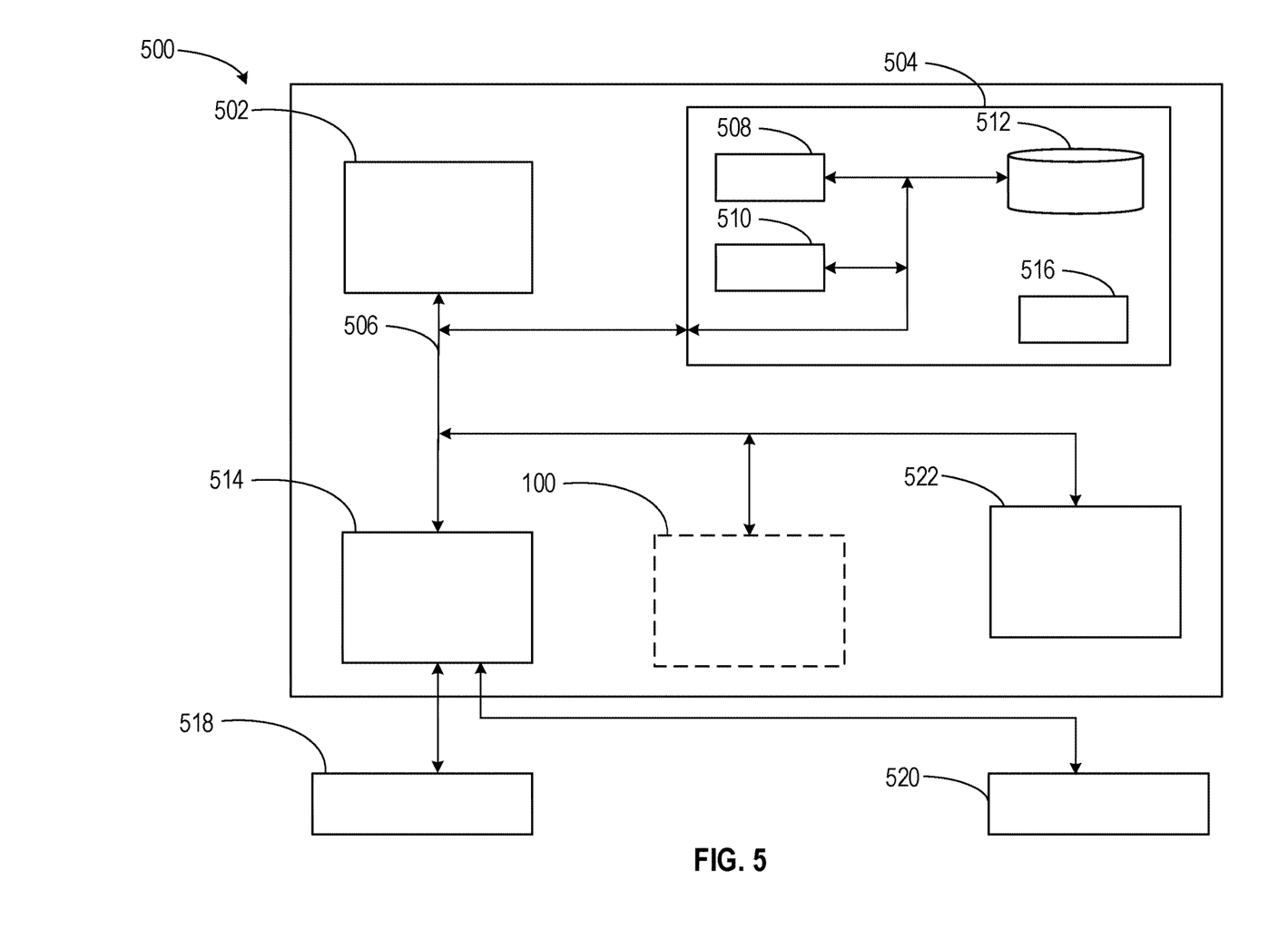
FIG. 5 depicts a block diagram of a computing system for dynamic screen sharing in a multi-screen presentation environment, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for dynamic screen sharing in a multi-screen presentation environment.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the analysis component 110, the presenter component 120, the visualization component 130, and the control component 140, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 6:
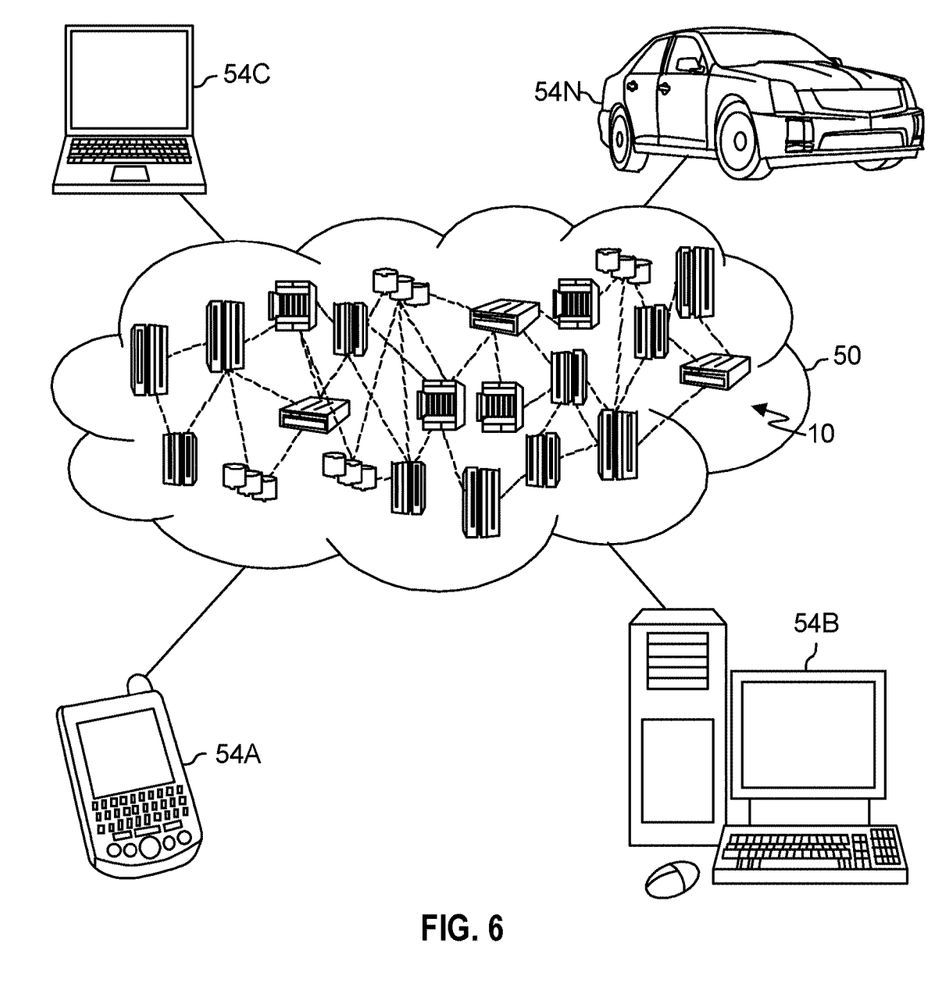
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
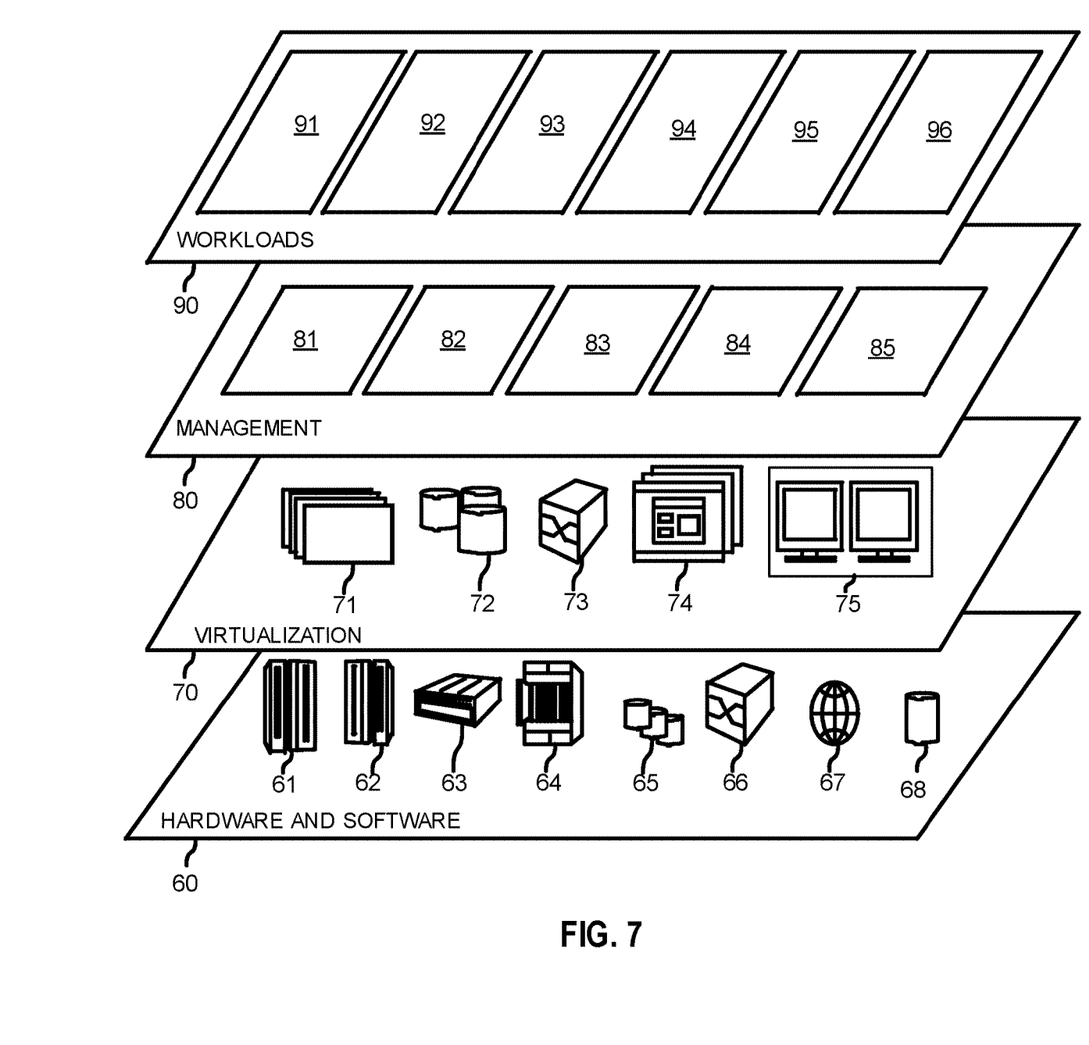
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic screen share processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a presentation schema for a multi-screen presentation;
   identifying a set of presenters for the multi-screen presentation;
   determining a sequence of presenters of the set of presenters and one or more transitions through the sequence of presenters based on the presentation schema and the set of presenters for the multi-screen presentation;
   determining a number of screens to be shared at a time during portions of the multi-screen presentation based upon the sequence of presenters;
   determining a presentation rate of the multi-screen presentation, the presentation rate determined during the multi-screen presentation;
   generating a workflow visualization for the multi-screen presentation based on the presentation schema, the sequence of presenters, and the presentation rate of the multi-screen presentation, the workflow visualization comprising a representation of the sequence of presenters, a representation of the one or more transitions through the sequence of presenters, and a shared screen depiction of a plurality of representations of shared screens comprising a simultaneous visualization of content being displayed upon a respective shared screen of a computing device of each presenter of the sequence of presenters; and
   dynamically transitioning between presenters of the set of presenters during the multi-screen presentation, the dynamic transitioning based on the presentation schema, the presentation rate, and the workflow visualization.

2. The method of claim 1, wherein the presentation schema is a presentation rule for the multi-screen presentation.

3. The method of claim 1, wherein the presentation schema is a presentation content of the multi-screen presentation.

4. The method of claim 1, wherein dynamically transitioning between the presenters transfers a display of the multi-screen presentation from a first presenter display to a second presenter display.

5. The method of claim 4, wherein dynamically transitioning between the presenters transfers voice control and screen share control from a first presenter to a second presenter.

6. The computer-implemented method of claim 1, wherein the presentation rate is determined at least in part by audience interactions associated with the multi-screen presentation.

7. The computer-implemented method of claim 1, wherein the one or more transitions indicate a respective change between screens associated with each presenter of the set of presenters of the multi-screen presentation.

8. A system, comprising:
one or more processors; and
a computer-readable storage medium, coupled to the one or more processors, storing program instructions that, when executed by the one or more processors, cause the one or more processors to perform operations comprising:
identifying a presentation schema for a multi-screen presentation;
identifying a set of presenters for the multi-screen presentation;
determining a sequence of presenters of the set of presenters and one or more transitions through the sequence of presenters based on the presentation scheman and the set of presenters for the multi-screen presentation;
determing a number of screens to be shared at a time during portions of the multi-screen presentation based upon the sequence of presenters;
determining a presentation rate of the multi-screen presentation, the presentation rate determined during the multi-screen presentation;
generation a workflow visualization for the multi-screen presentation based on the presentation schema, the sequence of presenters, and the presentation rate of the multi-screen presentation, the workflow visualization comprising a representation of the sequence of presenters, a representation of the one or more transitions through the sequence of presenters, a shared screen depiction of a plurality representations of shared screens comprising a simultaneous visualization of content being displayed upon a respective shared screen of a computing device of each presenter of the sequence of presenters; and
dynamically transitioning between presenters of the set of presenters during the multi-screen presentation, the dynamic transitioning based on the presentation schema, the presentation rate, and the workflow visualization.

9. The system of claim 8, wherein the presentation schema is a presentation rule for the multi-screen presentation.

10. The system of claim 8, wherein the presentation schema is a presentation content of the multi-screen presentation.

11. The system of claim 8, wherein dynamically transitioning between the presenters transfers a display of the multi-screen presentation from a first presenter display to a second presenter display.

12. The system of claim 11, wherein dynamically transitioning between the presenters transfers voice control and screen share control from a first presenter to a second presenter.

13. The system of claim 8, wherein the presentation rate is determined at least in part by audience interactions associated with the multi-screen presentation.

14. The system of claim 8, wherein the one or more transitions indicate a respective change between screens associated with each presenter of the set of presenters of the multi-screen presentation.

15. A computer program product comprising a computer readable storage medium having program instructions embodied therewith, the program instructions being executable by one or more processors to cause the one or more processors to perform operations comprising:
identifying a presentation schema for a multi-screen presentation;
identifying a set of presenters for the multi-screen presentation;
determining a sequence of presenters of the set of presenters and one or more transitions through the sequence of presenters based on the presentation schema and the set of presenters for the multi-screen presentation;
determining a number of screens to be shared at a time during portions of the multi-screen presentation based upon the sequence of presenters;
determining a presentation rate of the multi-screen presentation, the presentation rate determined during the multi-screen presentation;
generating a workflow visualization for the multi-screen presentation based on the presentation schema, the sequence of presenters, and the presentation rate of the multi-screen presentation, the workflow visualization comprising a representation of the sequence of presenters, a representation of the one or more transitions through the sequence of presenters, and a shared screen depiction of a plurality of representations of shared screens comprising a simultaneous visualization of content being displaced upon a respective shared screen of a computing device of each presenter of the sequence of presenters; and
dynamically transitioning between presenters of the set of presenters during the multi-screen presentation, the dynamic transitioning based on the presentation schema, the presentation rate, and the workflow visualization.

16. The computer program product of claim 15, wherein the presentation schema is a presentation rule for the multi-screen presentation.

17. The computer program product of claim 15, wherein the presentation schema is a presentation content of the multi-screen presentation.

18. The computer program product of claim 15, wherein dynamically transitioning between the presenters transfers a display of the multi-screen presentation from a first presenter display to a second presenter display and transfers voice control and screen share control from a first presenter to a second presenter.

19. The computer program product of claim 15, wherein the presentation rate is determined at least in part by audience interactions associated with the multi-screen presentation.

20. The computer program product of claim 15, wherein the one or more transitions indicate a respective change between screens associated with each presenter of the set of presenters of the multi-screen presentation.

* * * * *